(12) United States Patent
Park et al.

(10) Patent No.: US 12,689,104 B2
(45) Date of Patent: Jul. 21, 2026

(54) BATTERY MODULE

(71) Applicant: SK On Co., Ltd., Seoul (KR)

(72) Inventors: Ji Hoon Park, Daejeon (KR); Ji Hoon Lim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 636 days.

(21) Appl. No.: 17/706,220

(22) Filed: Mar. 28, 2022

(65) Prior Publication Data

US 2022/0311110 A1     Sep. 29, 2022

(30) Foreign Application Priority Data

Mar. 29, 2021    (KR) ........................ 10-2021-0040225

(51) Int. Cl.
| | |
|---|---|
| *H01M 50/588* | (2021.01) |
| *H01M 50/211* | (2021.01) |
| *H01M 50/296* | (2021.01) |
| *H01M 50/502* | (2021.01) |
| *H01M 50/543* | (2021.01) |
| *H01M 50/59* | (2021.01) |
| *H01M 50/591* | (2021.01) |
| *H01M 50/593* | (2021.01) |

(52) U.S. Cl.
CPC ....... *H01M 50/588* (2021.01); *H01M 50/211* (2021.01); *H01M 50/296* (2021.01); *H01M 50/502* (2021.01); *H01M 50/543* (2021.01); *H01M 50/59* (2021.01); *H01M 50/591* (2021.01); *H01M 50/593* (2021.01); *H01M 2200/00* (2013.01)

(58) Field of Classification Search
CPC ............. H01M 50/588; H01M 50/211; H01M 50/296; H01M 50/502; H01M 50/543; H01M 50/59; H01M 50/591; H01M 50/593; H01M 2200/00
See application file for complete search history.

(56) References Cited

U.S. PATENT DOCUMENTS

| | | | |
|---|---|---|---|
| 11,996,585 B2 | 5/2024 | Min et al. | |
| 2011/0318634 A1* | 12/2011 | Uh ...................... | H01M 50/593 429/178 |

(Continued)

FOREIGN PATENT DOCUMENTS

| | | |
|---|---|---|
| CN | 102299269 A | 12/2011 |
| CN | 103378319 A | 10/2013 |

(Continued)

OTHER PUBLICATIONS

Steve Winder, Chapter 15—Safety Issues, Power Supplies for LED Driving (Second Edition), Newnes, 2017, pp. 271-278 (Year: 2017).*

(Continued)

*Primary Examiner* — Ula C Ruddock
*Assistant Examiner* — Sydney L Kline
(74) *Attorney, Agent, or Firm* — IP & T GROUP LLP

(57) ABSTRACT

A battery module includes a battery cell; a case housing the battery cell, the case including a conductive material; a bus bar electrically connected to the battery cell, the bus bar including a terminal exposed to outside of the case; and a barrier disposed between the terminal and the case, wherein the barrier comprises a groove in an end of the barrier.

8 Claims, 9 Drawing Sheets

(56) References Cited

U.S. PATENT DOCUMENTS

| | | | | |
|---|---|---|---|---|
| 2013/0288099 A1* | 10/2013 | Kim | ..................... | H01M 50/30 |
| | | | | 429/120 |
| 2014/0349152 A1 | 11/2014 | Guen | | |
| 2020/0176739 A1* | 6/2020 | You | ..................... | H01M 50/224 |
| 2020/0343604 A1 | 10/2020 | Lee et al. | | |
| 2020/0411924 A1 | 12/2020 | Yun | | |
| 2021/0119310 A1* | 4/2021 | Sasaki | ................. | H01M 10/653 |
| 2021/0164511 A1 | 6/2021 | Jeong et al. | | |
| 2021/0265705 A1 | 8/2021 | Min et al. | | |
| 2021/0344074 A1 | 11/2021 | Jung et al. | | |

FOREIGN PATENT DOCUMENTS

| | | | | | |
|---|---|---|---|---|---|
| CN | 208336331 U | * | 1/2019 | | |
| CN | 112055897 A | | 12/2020 | | |
| CN | 112272897 A | | 1/2021 | | |
| EP | 2658008 B1 | | 10/2018 | | |
| EP | 3783694 A1 | | 2/2021 | | |
| KR | 10-2014-0137281 A | | 12/2014 | | |
| KR | 10-1754884 B1 | | 7/2017 | | |
| KR | 10-2018-0031444 A | | 3/2018 | | |
| KR | 20180031444 A | * | 3/2018 | ......... | H01M 50/591 |
| KR | 10-2019-0107900 A | | 9/2019 | | |
| KR | 10-2020-0073055 A | | 6/2020 | | |
| KR | 10-2020-0102292 A | | 8/2020 | | |
| KR | 10-2020-0125184 A | | 11/2020 | | |
| WO | WO-2019181508 A1 | * | 9/2019 | ......... | H01M 50/291 |
| WO | 2020/175881 A1 | | 9/2020 | | |

OTHER PUBLICATIONS

Extended European Search Report for the European Patent Application No. 22164730.8 issued by the European Patent Office on Oct. 24, 2022.

Office Action for Korean Patent Application No. 10-2021-0040225 issued by the Korean Patent Office on May 15, 2025.

Notice of Allowance (=Notification to Grant Patent Right for Invention) for Korean Patent Application No. 10-2021-0040225 issued by the Korean Patent Office on May 26, 2026.

Office Action for Chinese Patent Application No. 202210323832.1 issued by the Chinese Patent Office on Mar. 27, 2026.

* cited by examiner

I-I'

II-II'

IV-IV'

BATTERY MODULE

CROSS-REFERENCE TO RELATED APPLICATION(S)

This application claims benefit of priority to Korean Patent Application No. 10-2021-0040225 filed on Mar. 29, 2021 in the Korean Intellectual Property Office, the disclosure of which is incorporated herein by reference in its entirety.

BACKGROUND

1. Field

The present disclosure relates to a battery module.

2. Description of Related Art

As technological development and demand for a mobile device, an electric vehicle, an energy storage system (ESS), or the like increase, demand for a secondary battery as an energy source is rapidly increasing. A secondary battery is a battery that may repeat charging and discharging of electricity because mutual conversion between chemical energy and electrical energy is reversible.

However, since a lithium secondary battery includes a risk of explosion when overheated, securing safety thereof may be an important task. Overheating of the lithium secondary battery may occur due to various causes. For example, there may be a case in which an overcurrent exceeding a limit thereof flows through the lithium secondary battery. When an overcurrent flows through the lithium secondary battery, since the lithium secondary battery may generate heat by Joule heating, an internal temperature of the battery may increase rapidly. The lithium secondary battery heated to a temperature over a certain temperature, will explode, and the rapidly increased temperature may adversely affect neighboring lithium secondary batteries, causing a so-called thermal runaway in which the lithium secondary batteries explode in a chain. An overcurrent may occur, when a sharp metal object penetrates a lithium secondary battery, insulation between positive and negative electrodes is destroyed by shrinkage of a separator interposed between the positive and negative electrodes, a rush current is applied to a cell due to an abnormality in charging circuit or due to external load, or the like.

In a thermal runaway, a phenomenon in which a conductive material is scattered inside a battery pack comprised of a battery module may occur, and if by-products are loaded around a high voltage terminal, an insulation distance may rapidly decrease. In a specific battery module, if the insulation distance between the terminal and a surrounding electrical-conductive member (e.g., an aluminum case or the like) is not sufficiently secured, the terminal and the surrounding electrical-conductive member may be electrically connected to each other by a conductive material discharged from other battery modules, intensifying the thermal runaway.

SUMMARY

An aspect of the present disclosure is to provide a means for preventing a terminal of a battery module from being electrically connected with a surrounding conductive member even in a thermal runaway event.

According to an aspect of the present disclosure, a battery module includes a battery cell; a case housing the battery cell, the case including a conductive material; a bus bar electrically connected to the battery cell, the bus bar including a terminal exposed to the outside of the case; and a barrier disposed between the terminal and the case, wherein the barrier includes a groove in an end of the barrier.

In an embodiment, the barrier may be disposed in a space separated between the terminal and the case in a first direction, and may extend in a second direction, perpendicular to the first direction, and the groove may be formed in an end of the barrier in the second direction.

In an embodiment, the groove may include a depth in the second direction.

In an embodiment, the battery module may further comprise a cover disposed on the terminal.

In an embodiment, the barrier may be configured to surround a peripheral edge of the terminal.

In an embodiment, the groove extends along the end of the barrier.

In an embodiment, a cover disposed on the barrier may be included, wherein the cover may include a protrusion inserted into the groove of the barrier.

In an embodiment, at least a portion of the barrier may be configured such that a creepage distance between the terminal and the case is 12.5 mm or more, and is less than or equal to a surface distance or a thickness of the barrier.

In an embodiment, the groove may include a plurality of grooves formed between the terminal and the case.

In an embodiment, the cover may further include a hook formed in an end thereof, wherein the barrier may include a locking portion accommodating the hook.

According to an aspect of the present disclosure, a battery module includes a plurality of battery cells stacked within a case; the case which includes a conductive material; an internal bus bar electrically connecting the plurality of the battery cells, the internal bus bar including at least one terminal protruding out of the case and configured to be coupled with an external bus bar; a barrier disposed between the terminal and the case, the barrier including at least one groove formed at a first end of the barrier; and a cover disposed on the barrier, the cover comprising at least one protrusion inserted into the at least one groove of the barrier.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the drawings. However, the spirit of the present disclosure is not limited to the embodiments presented herein.

For example, a person of ordinary skill in the art who understands the spirit of the present disclosure may suggest other embodiments included within the scope of the spirit of the present disclosure by addition, change, deletion, or the like of components, and this will be said to be included within the scope of the spirit of the present disclosure.

Figure 1:
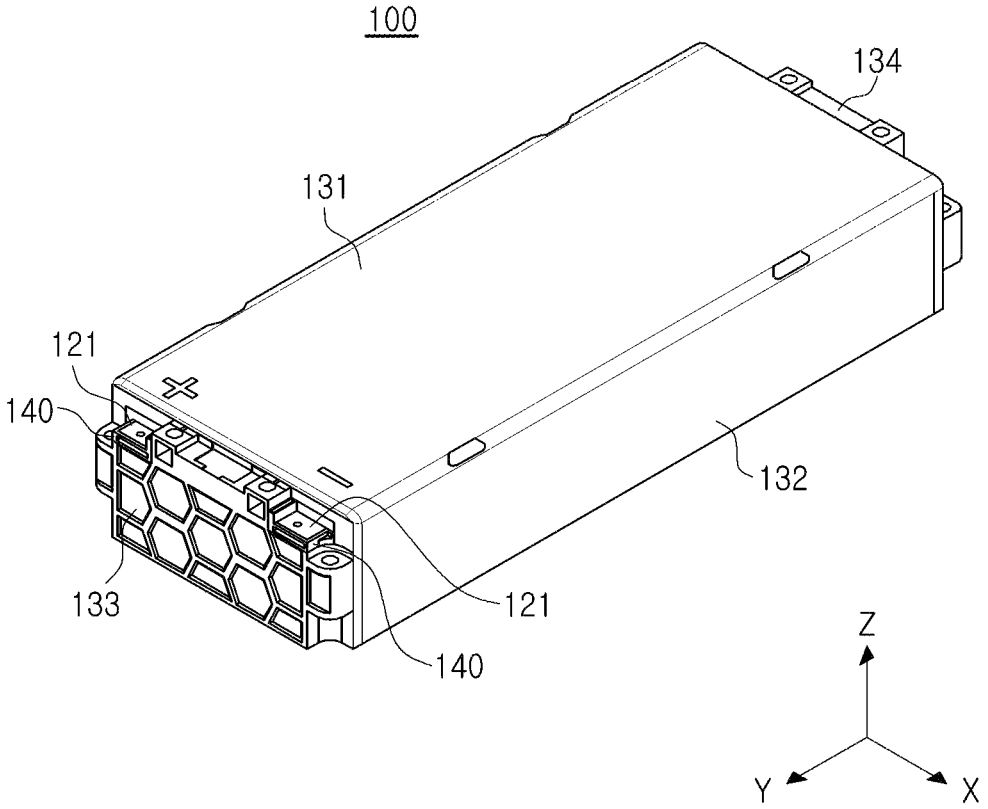
FIG. 1 is a perspective view of a battery module according to a first embodiment.
Figure 2:
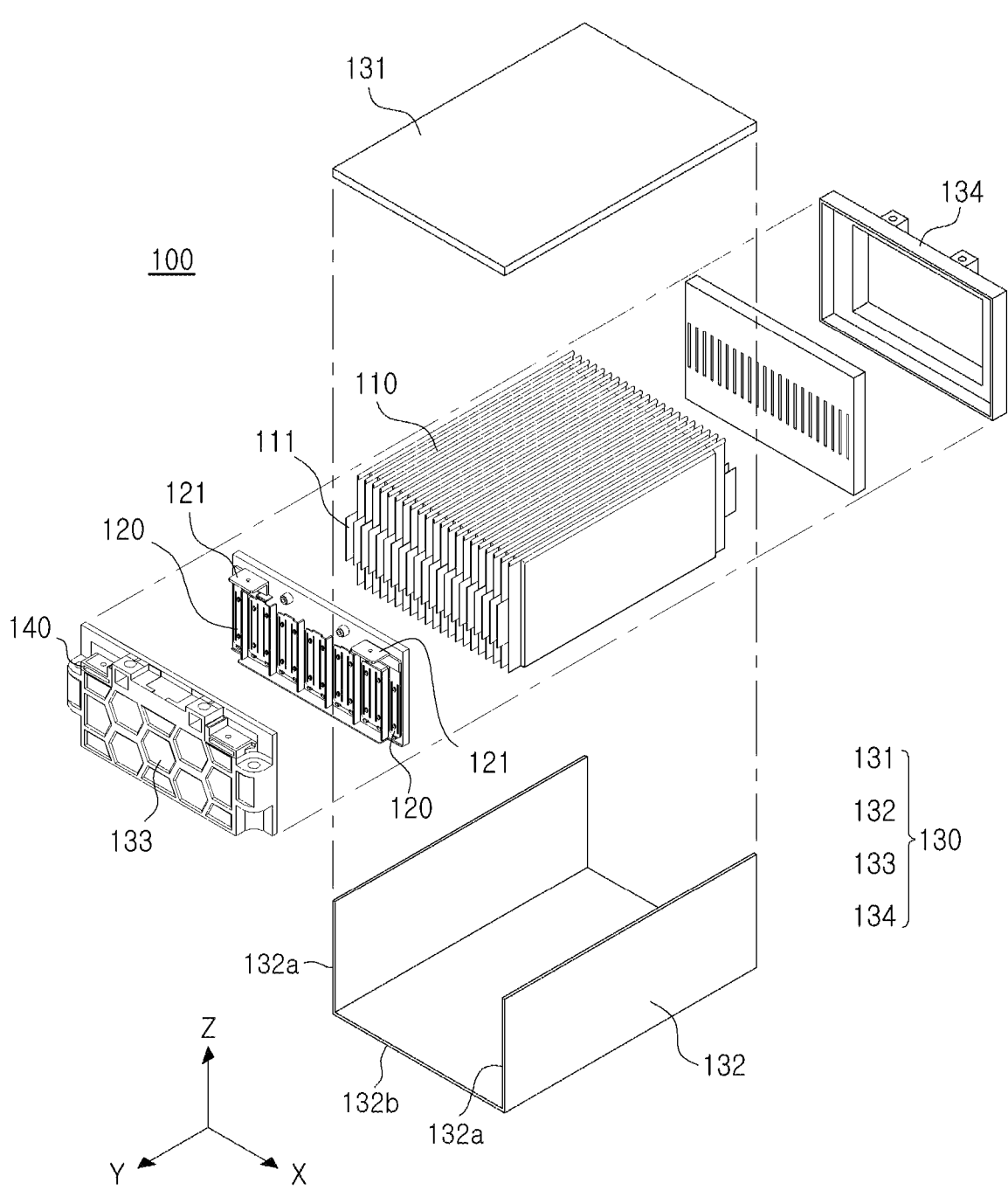
FIG. 2 is an exploded perspective view of a battery module according to the first embodiment.

FIG. 1 is a perspective view of a battery module 100 according to a first embodiment. FIG. 2 is an exploded perspective view of the battery module 100.

Referring to FIGS. 1 and 2, the battery module 100 may include a plurality of battery cells 110. The battery cells 110 may be stacked in one direction, and the battery cells 110 may include an electrode tabs (or electrode leads) 111 led out in a direction perpendicular to a stacking direction. The electrode tabs (or electrode leads) 111 may be connected to an internal bus bar 120. For example, the electrode tabs (or electrode leads) 111 of the battery cells 110 may be welded to the internal bus bar 120.

The battery module 100 may include a case 130 for housing the battery cells 110. For example, the case 130 may be provided in a rectangular box shape, and battery cells 110 may be arranged in one direction therein. The case 130 may include an upper plate 131, a lower plate 132, a front plate 133, and a rear plate 134. In the illustrated embodiment of FIG. 2, the lower plate 132 may include a bottom flat panel 132b and vertical side panels 132a. The side panels 132a are also referred to herein as side plates. The lower plate 132 may be integrally formed as illustrated in FIG. 2, as an example. In a variation of this embodiment the bottom panel 132b and the side panels 132a of the lower plate 132 may be formed separately and coupled together via any suitable connector or method. The upper plate 131, and the lower plate 132 may be formed separately as illustrated in FIG. 2 or in the alternative may be integrally formed. The upper, front, and rear plates 131, 133, and 134 may be formed separately or may be integrally formed.

The internal bus bar 120 may be electrically connected to the electrode tabs (or electrode leads) 111 of the battery cells 110 and a terminal 121 exposed to the outside of the case 130. For example, the terminal 121 may include a shape extending in a front direction of the battery module 100, and the terminal 121 may be exposed to a front of the front plate 133. Referring to FIG. 2, the terminal 121 may be bent in an end of the internal bus bar 120, and may extend in a +Y direction.

The battery module 100 may be electrically connected through an external bus bar, and the external bus bar may be connected to the internal bus bar 120 of the battery module 100 (for example, the terminal 121 of the internal bus bar 120).

Figure 3:
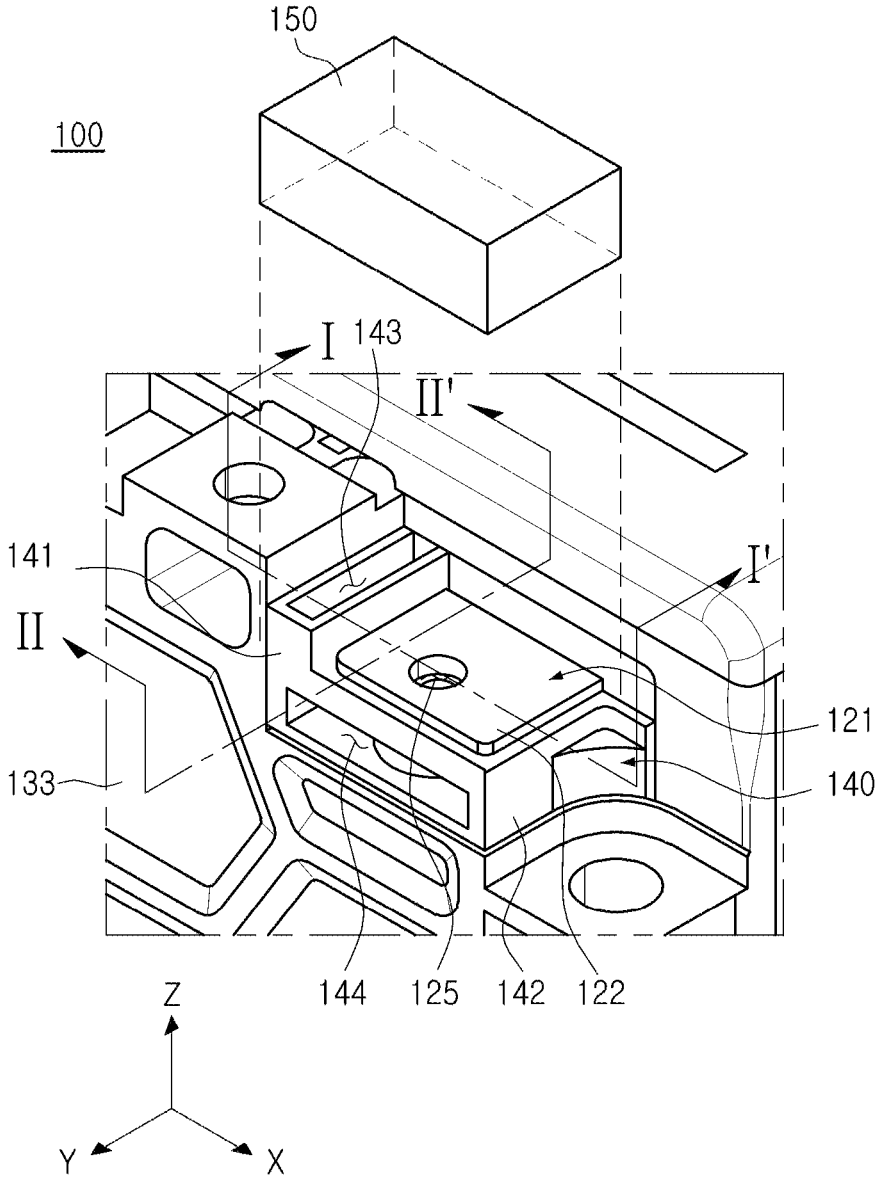
FIG. 3 is a partially enlarged view of the terminal of FIG. 1.
Figure 4:
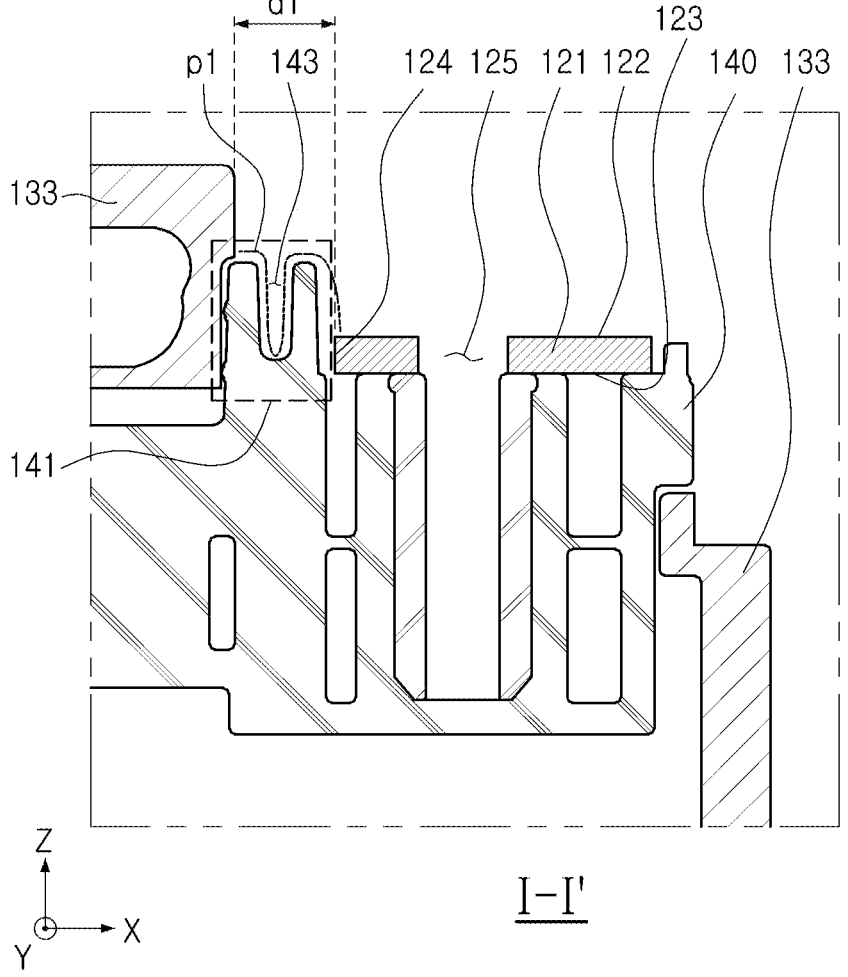
FIG. 4 is a cross-sectional view of FIG. 3, taken along line I-I'.
Figure 5:
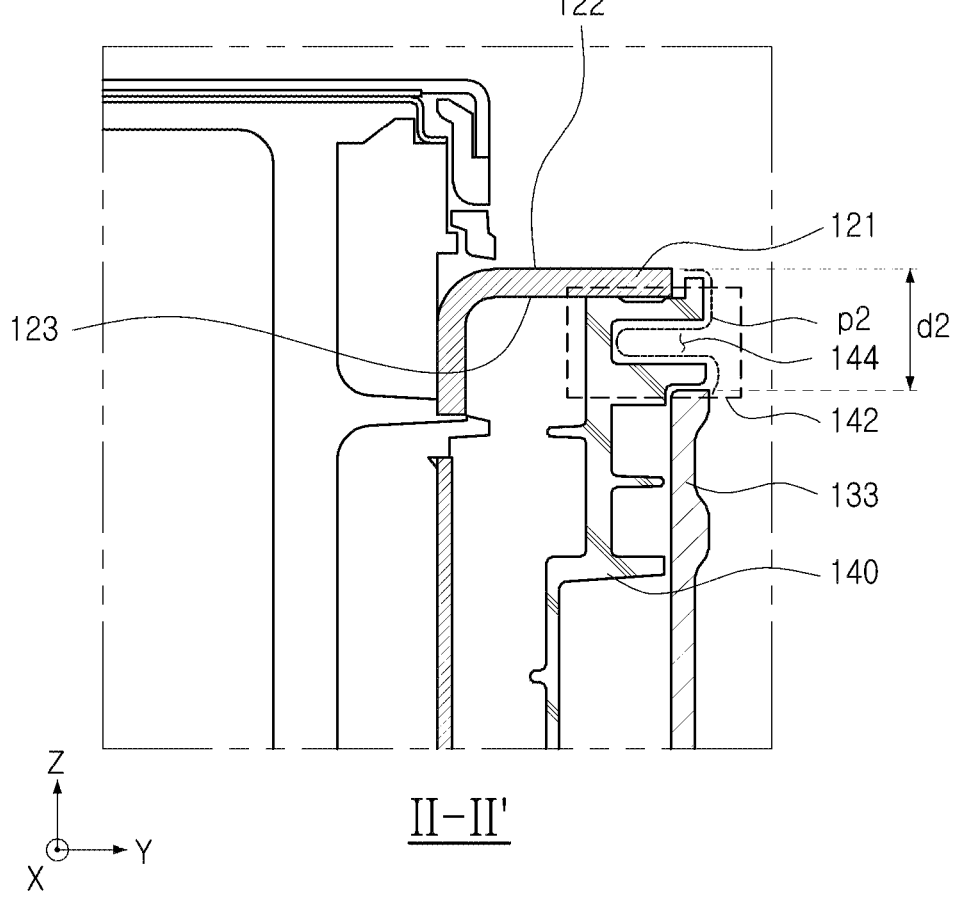
FIG. 5 is a cross-sectional view of FIG. 3, taken along line II-II'.

FIG. 3 is a partially enlarged view of the terminal 121 of FIG. 1. FIG. 4 is a cross-sectional view of FIG. 3, taken along line I-I'. FIG. 5 is a cross-sectional view of FIG. 3, taken along line II-II'.

Referring to FIG. 3 of the present disclosure, the terminal 121 may include a plate having a rectangular shape. An upper surface 122 of the terminal 121 may be in contact with the external bus bar. A lower surface 123 of the terminal 121 may be mounted on an insulating member 140. The terminal 121 may be bolted to the external bus bar. For example, the terminal 121 may include a fastening hole 125 for accommodating a connector such as a bolt. For example, after an external bus bar (not illustrated) is seated on the upper surface 122 of the terminal 121, the bolt shank may pass through the external bus bar and the terminal 121 and secured with a nut to couple the terminal 121 and the external bus bar. In the present disclosure, the upper surface 122 of the terminal 121 refers to a surface directed in a +Z direction, and the lower surface 123 of the terminal 121 refers to a surface directed in a −Z direction.

The case 130 may be formed of a conductive material. For example, the case 130 may be formed of an aluminum plate. In this case, the front plate 133 of the case 130 from which the terminal 121 of the internal bus bar 120 is externally exposed should be insulated from the terminal 121. Therefore, a certain insulation distance (e.g., an air clearance distance or a creepage distance) should be secured between the terminal 121 and the front plate 133.

In a battery pack including a plurality of battery modules, when a thermal runaway event occurs in one of the battery modules, a conductive material, as well as gas and flame, may be scattered inside the battery pack. When the terminal 121 of the battery module 100 is exposed to a conductive material discharged from another battery module, an insulation between the terminal 121 and the front plate 133 may be broken. For example, a conductive by-product may surround the terminal 121, and may make an insulation distance between the terminal 121 and the front plate 133 considerably shorter. When an insulation between the terminal 121 and the front plate 133 is broken, excessive current flows in an internal circuit of the battery module 100 (for example, the internal bus bar 120), causing a fire in the battery module 100. For example, an event such as a thermal runaway event or the like occurring in a specific battery module 100 may cause a series ignition of other battery modules 100.

In order to prevent such a series ignition, the insulation distance between the terminal 121 and the front plate 133 of the battery module 100 should be set to a value that is greater than a distance required under normal operating conditions. For example, even when the insulating distance between the terminal 121 and the front plate 133 is secured to the extent that there is no problem in a general use environment, an insulation between the terminal 121 and the front plate 133 due to conductive materials scattered in a thermal runaway event may be broken. Therefore, in order not to break the insulation between the internal bus bar 120 and the front plate 133 even in a thermal runaway event, the insulation distance between the terminal 121 and the front plate 133 should be set more conservatively.

An insulation between the front plate 133 and the terminal 121 may be reinforced by increasing an air clearance distance and/or a creepage distance between the front plate 133 and the terminal 121. The creepage distance refers to the shortest distance measured along a surface of an insulating material between two (2) conductive members. The air clearance distance refers to the shortest distance measured in air between two (2) conductive members.

For example, referring to GB/T16935.1 (IEC 60664-1), a standard related to an insulation distance, a creepage distance may be required to vary depending on a degree of contamination or characteristics of a pollutant. For example, in a situation in which conductive pollution occurs (Pollution Degree 3) and in a situation in which a pollutant having a high comparative tracking index (CTI) (material group III), a creepage distance between conductive members should be secured as 12.5 mm or more. For example, in a thermal runaway event, a conductive material may be scattered inside a battery pack, and therefore, a creepage distance between the terminal 121 and the front plate 133 should be 12.5 mm or more. The present disclosure provides a technical solution for increasing a creepage distance between the terminal 121 and the front plate 133 in preparation for a thermal runaway event.

Referring to FIGS. 3 and 4, an insulating member 140 may be disposed between the terminal 121 and the front plate 133. The insulating member 140 may reinforce an insulation between the front plate 133 and the terminal 121.

In the present disclosure, the insulating member 140 refers to a portion disposed between the terminal 121 and the front plate 133. However, this is for convenience of description, and the insulating member 140 of the present disclosure may include a portion disposed inside the front plate 133 and not being visible from the outside the battery module 100.

In an embodiment, the insulating member 140 may include barriers 141 and 142 disposed between the terminal 121 and the front plate 133. In one embodiment, the terminal 121 may be disposed to be spaced apart from the front plate 133 by a predetermined distance, and the barriers 141 and 142 may be located in a space between the terminal 121 and the front plate 133. An insulation between the front plate 133 and the terminal 121 may be reinforced due to the barriers 141 and 142.

In one embodiment, when the terminal 121 is spaced apart from the front plate 133 in a first direction, the barriers 141 and 142 may extend between the terminal 121 and the front plate 133 in a second direction, perpendicular to the first direction. For example, the barriers 141 and 142 may be provided as wall type barriers having a thickness in the first direction.

For example, referring to FIG. 4, the terminal 121 may be spaced apart from the front plate 133 by a first distance d1 in the X direction, and a first barrier 141 extending in the Y direction (or in the Z direction) may be disposed between the front plate 133 and the terminal 121. For another example, referring to FIG. 5, the terminal 121 may be spaced apart from the front plate 133 by a second distance d2 in the Z direction, and a second barrier 142 extending in the Y direction (or in the Z direction) may be disposed between the front plate 133 and the terminal 121.

The insulating member 140 located between the terminal 121 and the front plate 133 may be configured to provide a relatively large insulating distance between the terminal 121 and the front plate 133. In an embodiment, the barriers 141 and 142 may be configured to increase a creepage distance between the terminal 121 and the front plate 133. In an embodiment, at least a portion of the barriers 141 and 142 may be configured such that a creepage distance between the terminal 121 and the front plate 133 is 12.5 mm or more.

In order to increase the creepage distance, in an embodiment, the barriers 141 and 142 may include grooves 143 and 144 in the end. In an embodiment, the terminal 121 may be spaced apart from the front plate 133 in the first direction, and the barriers 141 and 142 may extend in the second direction, perpendicular to the first direction. In this case, the grooves 143 and 144 may be provided in an end of the barriers 141 and 142 in the second direction.

For example, referring to FIG. 4, the terminal 121 and the front plate 133 may be spaced apart from each other by a first distance d1 in the X direction, and the first barrier 141 extending in the +Z direction may be disposed between the terminal 121 and the front plate 133. A first groove 143 may be provided in an end of the first barrier 141 in the +Z direction. For another example, referring to FIG. 5, the terminal 121 and the front plate 133 may be spaced apart by a second distance d2 in the Z direction, and the second barrier 142 disposed between the terminal 121 and the front plate 133 may extend in the +Y direction. A second groove 144 may be provided in an end of the second barrier 142 in the +Y direction.

In an embodiment, the grooves 143 and 144 may extend in longitudinal directions of the barriers 141 and 142. For example, referring to FIG. 4, the first barrier 141 may extend in the Z direction, and the first groove 143 may include a depth in the Z direction. For another example, referring to FIG. 5, the second barrier 142 may extend in the Y direction, and the second groove 144 may include a depth in the Y direction.

Since a creepage distance is measured along surfaces of the barriers 141 and 142, when the barriers 141 and 142 include the grooves 143 and 144 on outer surfaces, a creepage distance between the front plate 133 and the terminals 121 may increase. This may contribute to reinforcing an insulation between the terminal 121 and the case 130.

Referring to FIG. 4, in an embodiment, the first barrier 141 may include the first groove 143 extending in the Z direction in an end thereof. A creepage distance between the terminal 121 and the front plate 133 may increase by a distance corresponding to an extended surface of the first barrier 141 due to the first groove 143. A creepage distance between the terminal 121 and a portion of the front plate 133 located close to the terminal 121 in the X direction may be measured along a first path p1. In an embodiment, at least a portion of the first barrier 141 may be configured such that a distance of the first path p1 is 12.5 mm or more.

For instance, compared with a case not including the first groove 143, a creepage distance between the terminal 121 and the front plate 133 may increase by at least twice a depth of the first groove 143. Therefore, an insulation between the terminal 121 and the front plate 133 may be reinforced.

Referring to FIG. 5, in an embodiment, the second barrier 142 may include the second groove 144 extending in the Y direction in an end thereof. A creepage distance between the terminal 121 and the front plate 133 may increase by a distance corresponding to an extended surface of the second barrier 142 due to the second groove 144. A creepage distance between the terminal 121 and a portion of the front plate 133 located close to the terminal 121 in the Z direction may be measured along a second path p2. In an embodiment, at least a portion of the second barrier 142 may be configured such that a distance of the second path p2 is 12.5 mm or more.

Compared with a case including no second groove 144, a creepage distance between the terminal 121 and the front plate 133 may increase by at least twice a depth of the second groove 144. Therefore, an insulation between the terminal 121 and the front plate 133 may be reinforced.

In the embodiment illustrated in FIGS. 1 to 5, the first barrier 141 and the second barrier 142 may include the grooves 143 and 144, respectively, but this is only illustrative. In other embodiments, a groove may be formed as a plurality of grooves between the terminal 121 and the case 130. For example, the first groove 143 may be comprised of two or more grooves extending in parallel from an end of the first barrier 141. For another example, the second groove 144 may be comprised of two or more grooves extending in parallel from an end of the second barrier 142.

In the embodiment illustrated in FIGS. 1 to 5, the barriers 141 and 142 may include the grooves 143 and 144. In other embodiments, the barriers 141 and 142 may not include the grooves 143 and 144. Alternatively, or additionally to the grooves 143, 144, the barriers 141 and 142 may have a greater thickness and thus have a creepage distance of 12.5 mm or more, compared to the illustrated embodiment. For example, in FIG. 4, when the first groove 143 does not exist in the first barrier 141, a thickness of the first barrier 141 may be larger by a creepage distance that may be secured by the first groove 143. In this case, an area of the terminal 121 may be reduced, compared to the illustrated embodiment. As another example, in FIG. 5, when the second groove 144 does not exist in the second barrier 142, a thickness of the second barrier 142 may be larger by a creepage distance that may be secured by the second groove 144.

Referring to FIG. 3, in an embodiment, the battery module 100 may further include a cover 150 disposed on the insulating member 140 to cover the terminal 121. The cover 150 may be coupled to the insulating member 140, and the terminal 121 may be located inside an assembly of the cover 150 and the insulating member 140.

Even when there is a conductive material scattered outside the battery module 100 in a thermal runaway event, the cover 150 may minimize or prevent the terminal 121 from being exposed to the conductive material.

In an embodiment, when it is difficult to secure an insulation distance between the terminal 121 and a surrounding metal component (e.g., the case 130) due to a structure of the battery module 100, an area of the terminal 121 may be reduced. The area of the terminal 121 (that is, an area of the upper surface 122 of the terminal 121) may be reduced to a limit in which there is no problem in internal resistance value requirements between the external bus bar and the terminal 121. For example, in a high voltage bus bar, the terminal 121 may have a minimal cross-sectional area corresponding to a current value according to DIN 43 671 standard. (Application example: a width of 30 mm or more, a thickness of 3t or more, a current standard of 400 A)

Figure 6:
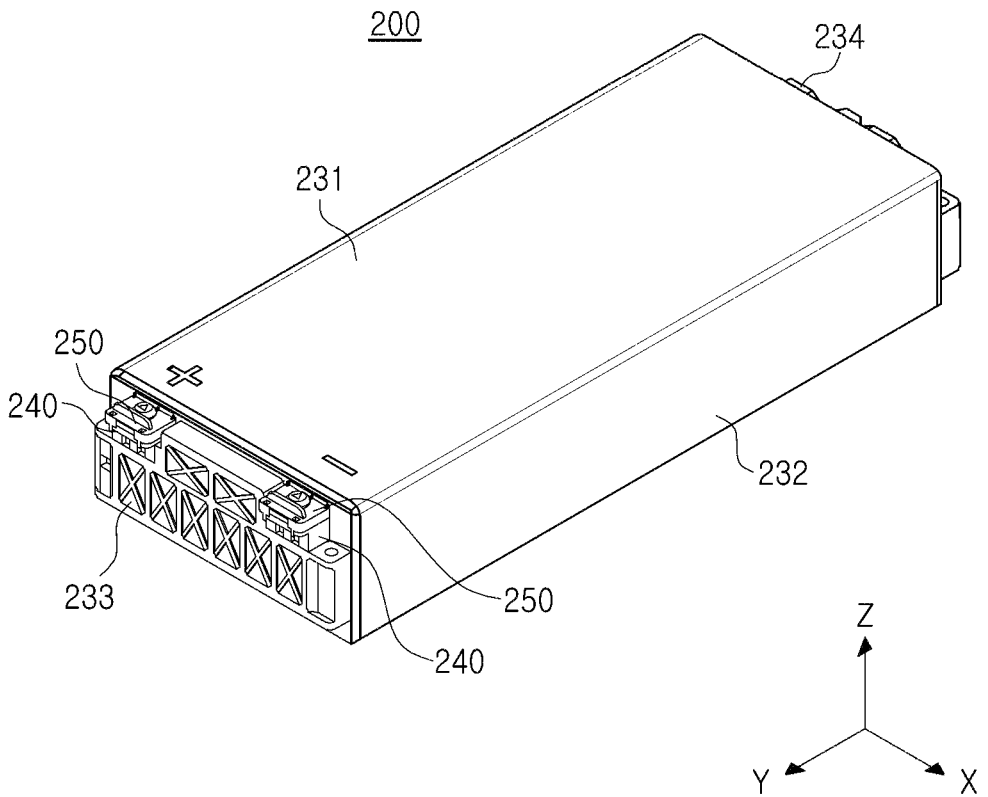
FIG. 6 is a perspective view of a battery module according to a second embodiment.
Figure 7:
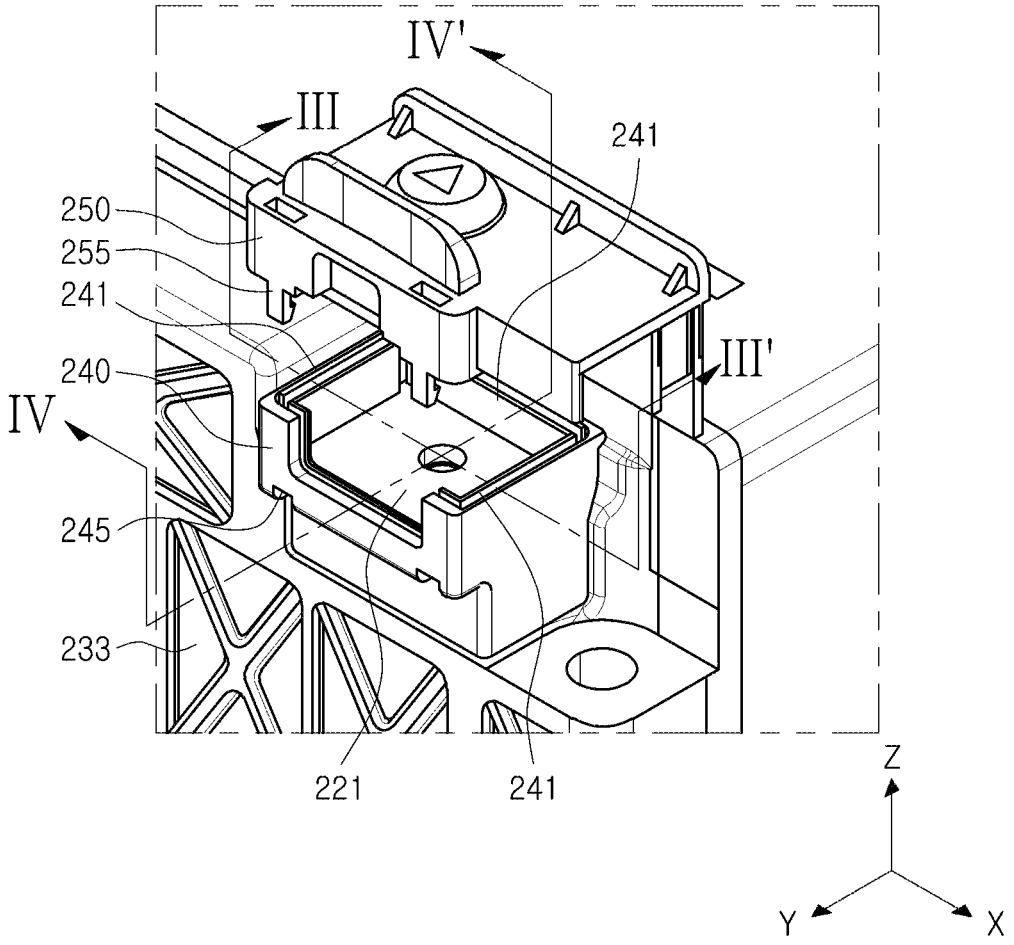
FIG. 7 is a partially enlarged view of a terminal of FIG. 6.
Figure 8:
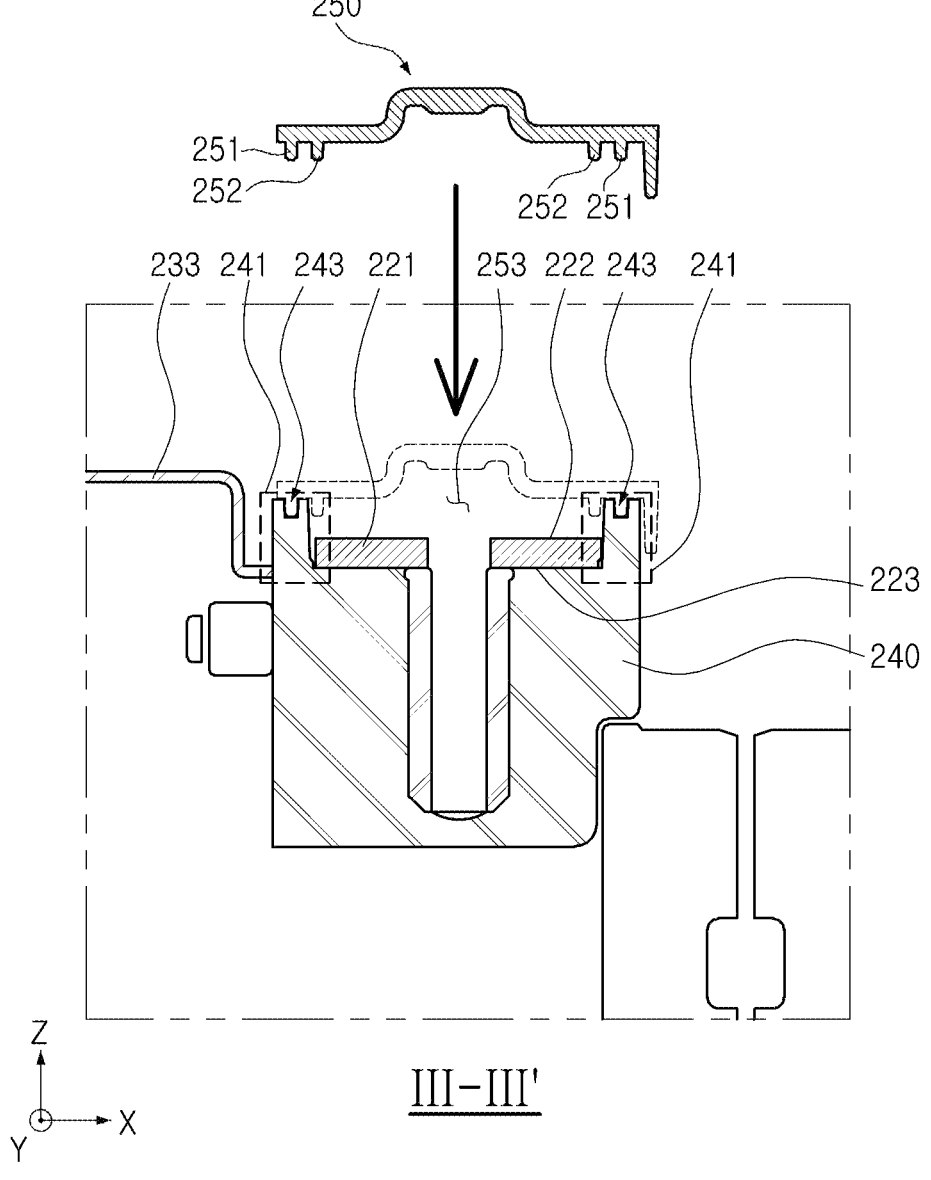
FIG. 8 is a cross-sectional view of FIG. 7, taken along line III-III'.
Figure 9:
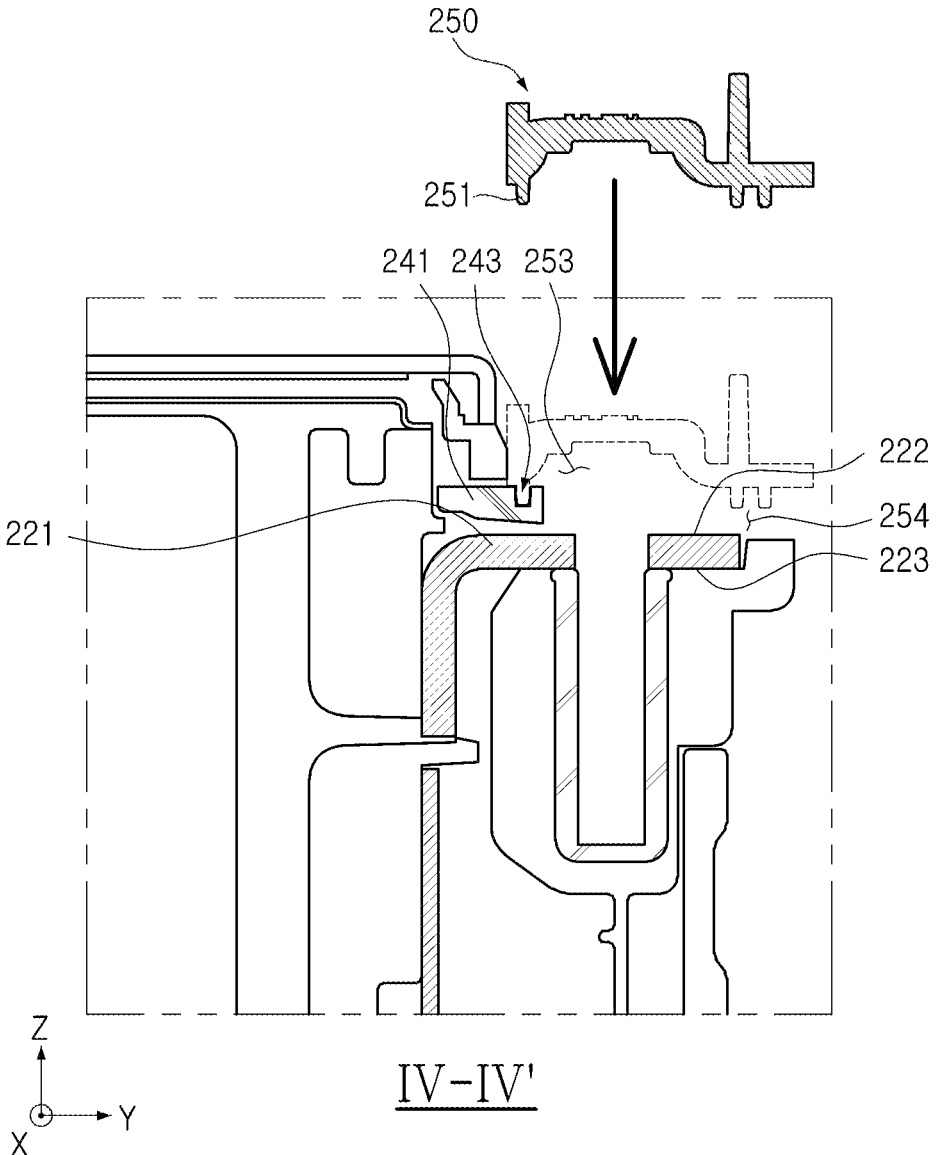
FIG. 9 is a cross-sectional view of FIG. 7, taken along line IV-IV'.

FIG. 6 is a perspective view of a battery module 200 according to a second embodiment. FIG. 7 is a partially enlarged view of the terminal 221 of FIG. 6. FIG. 8 is a cross-sectional view of FIG. 7, taken along line III-III'. FIG. 9 is a cross-sectional view of FIG. 7, taken along line IV-IV'. A battery module 200 of FIG. 6 may include a structure, similar to a structure of the battery module 100 of FIG. 1, and redundant descriptions thereof will be omitted.

Referring to FIG. 7, in an embodiment, an insulating member 240 may be configured to surround a peripheral edge of the terminal 221. In an embodiment, the insulating member 240 may include a barrier 241 surrounding the peripheral edge of the terminal 221. For example, the barrier 241 may be provided in a wall (or a fence) shape surrounding the peripheral edge of the rectangular terminal 221. Referring to FIG. 8, the barrier 241 may be disposed in the +X and −X directions of the terminal 221, and the barrier 241 may protrude in the +Z direction, based on an upper surface 222 of the terminal 221. Referring to FIG. 9, the barrier 241 may be disposed in the −Y direction of the terminal 221.

In an embodiment, the barrier 241 may include a groove 243 in an end thereof. For example, the barrier 241 may be provided in a shape of a fence extending in the Z direction, and the groove 243 may be provided in an end of the fence in the +Z direction. A creepage distance between the terminal 221 and a front plate 233 may be measured along a surface of the barrier 241. Therefore, the creepage distance may be longer than those of a case without the groove 243. The groove 243 provided in the end of the barrier 241 may include a depth in a direction, parallel to an extending direction of the barrier 241.

In an embodiment, the barrier 241 may be configured to surround the peripheral edge of the terminal 221, and the groove 243 may extend along the end of the barrier 241.

In an embodiment, the battery module 200 may further include a cover 250 covering the upper surface 222 of the terminal 221. The cover 250 may be coupled to the insulating member 240. For example, the cover 250 may include a hook 255, and the insulating member 240 may include a locking portion 245 accommodating the hook 255. The terminal 221 may be accommodated in a space 253 defined by the cover 250 and the insulating member 240, which may minimize or prevent the terminal 221 from being exposed to a conductive material scattered outside the battery module 200, in a thermal runaway event.

The battery modules 200 may be connected through an external bus bar, and one end and the other end of the external bus bar may be connected to internal bus bars 220 of different battery modules 200 (in particular, terminals 221 of the internal bus bars 220), respectively. Therefore, the insulating member 240 or the cover 250 may not completely seal the terminal 221, and a portion of the insulating member 240 or a portion of the cover 250 may be opened such that the external bus bar is in contact with the terminal 221. For example, referring to FIG. 9, a hole 254 for the external bus bar may be provided in the cover 250, the insulating member 240, or an assembly of the cover 250 and the insulating member 240.

The illustrated battery module 200 may be an example in which the external bus bar extends from the terminal 221 to a front surface of the battery module 200, and when the cover 250 is fitted to the insulating member 240, the cover 250 and the insulating member 240 may define the hole 254 that may be open toward the front surface. However, this is only illustrative, and in another embodiment, a hole for opening a bus bar may be provided to face in a lateral direction.

Referring to FIGS. 8 and 9, in an embodiment, the cover 250 may further include a first protrusion 251 inserted into the groove 243 of the barrier 241. The first protrusion 251 may be fitted into the groove 243, sealing property between the cover 250 and the barrier 241 may be reinforced which may minimize or prevent a foreign substance (e.g., conductive materials, gases, flames, or the like) from being introduced into the internal space 253 of the barrier 241.

In an embodiment, the cover 250 may further include a second protrusion 252 extending to an inner surface or an outer surface of the barrier 241. The second protrusion 252 may be spaced apart from the first protrusion 251 in an inner or outer direction of the cover 250. The first protrusion 251 and the second protrusion 252 may be configured to engage an end of the barrier 241, which may further enhance sealing property between the cover 250 and the barrier 241.

According to an embodiment of the present disclosure, a terminal of a battery module may not be electrically connected to a neighboring conductive member even in a thermal runaway event.

While the detailed description of the present invention has described the concrete embodiments, the embodiments can be modified without departing from the scope of the present invention. Therefore, the scope of the present invention should not be limited to the described embodiments, but should be defined by the appended claims and the equivalents thereof.

What is claimed is:

1. A battery module comprising:

a battery cell;

a case housing the battery cell including an upper plate, a lower plate, a front plate, and a rear plate, the case including a conductive material;

a bus bar electrically connected to the battery cell, the bus bar including a terminal exposed to outside of the front plate of the case; and an insulating member disposed between the terminal and the front plate of the case, wherein the insulating member includes a barrier including a groove in an end of the barrier, wherein the barrier is disposed between the terminal and the case in a first direction, extends in a second direction, and exposed to outside of the insulating member in a third direction, wherein the second direction is perpendicular to the first direction and the third direction, wherein the groove is formed in an end of the barrier in the second direction, wherein the groove includes a depth in the second direction, and wherein the depth of the groove is the distance from an open surface of the barrier to a recessed bottom surface of the groove.

2. The battery module of claim 1, further comprising a cover disposed on the terminal.

3. The battery module of claim 1, wherein the barrier is configured to surround a peripheral edge of the terminal.

4. The battery module of claim 3, wherein the groove extends along the end of the barrier.

5. The battery module of claim 4, further comprising a cover disposed on the barrier, wherein the cover comprises a protrusion inserted into the groove of the barrier.

6. The battery module of claim 1, wherein the groove is provided as a plurality of grooves formed between the terminal and the case.

7. The battery module of claim 5, wherein the cover further comprises a hook formed in an end thereof, and wherein the barrier comprises a locking portion accommodating the hook.

8. A battery module comprising:

a plurality of battery cells stacked within a case including an upper plate, a lower plate, a front plate, and a rear plate;

the case which includes a conductive material;

an internal bus bar electrically connecting the plurality of the battery cells, the internal bus bar including at least one terminal protruding out of the front plate of the case and configured to be coupled with an external bus bar;

an insulating member disposed between the terminal and the front plate of the case, the insulating member includes a barrier including at least one groove formed at a first end of the barrier;

and a cover disposed on the barrier, the cover comprising at least one protrusion inserted into the at least one groove of the barrier, wherein the barrier is disposed between the terminal and the front plate of the case in a first direction, extends in a second direction, and exposed to outside of the insulating member in a third direction, wherein the second direction is perpendicular to the first direction and the third direction, wherein the at least one groove is formed in the second direction, and wherein the at least one groove includes a depth in the second direction from an open surface to a recessed bottom surface.

* * * * *